United States Patent
Ringuette et al.

(10) Patent No.: US 11,537,824 B2
(45) Date of Patent: Dec. 27, 2022

(54) CATEGORIZATION OF PHOTOGRAPHS

(71) Applicant: Lenovo (Singapore) Pte. Ltd., Singapore (SG)

(72) Inventors: Justin Michael Ringuette, Morrisville, NC (US); Robert Norton, Raleigh, NC (US); Sandy Scott Collins, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 357 days.

(21) Appl. No.: 16/795,277

(22) Filed: Feb. 19, 2020

(65) Prior Publication Data

US 2021/0256297 A1 Aug. 19, 2021

(51) Int. Cl.
| | |
|---|---|
| *G06F 16/35* | (2019.01) |
| *G06F 16/38* | (2019.01) |
| *G06F 16/387* | (2019.01) |
| *G06K 9/62* | (2022.01) |
| *H04N 5/232* | (2006.01) |
| *G10L 15/22* | (2006.01) |

(52) U.S. Cl.
CPC .............. *G06K 9/628* (2013.01); *G10L 15/22* (2013.01); *H04N 5/232935* (2018.08); *G10L 2015/223* (2013.01)

(58) Field of Classification Search
USPC .............. 382/100–104, 155–160, 181–229; 704/1–276
See application file for complete search history.

(56) References Cited

U.S. PATENT DOCUMENTS

| | | | |
|---|---|---|---|
| 8,341,555 B2 * | 12/2012 | Ayatsuka | G06F 16/54 715/825 |
| 9,854,206 B1 * | 12/2017 | Ren | H04N 7/147 |
| 10,027,766 B2 * | 7/2018 | Greenan | H04L 67/1097 |
| 10,373,086 B2 * | 8/2019 | Remaker | H04L 67/535 |
| 2017/0075924 A1 * | 3/2017 | Rogers | H04W 4/18 |
| 2017/0185670 A1 * | 6/2017 | Dua | G06F 16/334 |
| 2018/0095960 A1 * | 4/2018 | Tan | G11B 27/031 |

FOREIGN PATENT DOCUMENTS

JP 2019091480 * 6/2019 ............. G06F 21/62

* cited by examiner

*Primary Examiner* — Marcellus J Augustin
(74) *Attorney, Agent, or Firm* — John M. Rogitz; John L. Rogitz

(57) ABSTRACT

In one aspect, a device may include at least one processor and storage accessible to the at least one processor. The storage may include instructions executable by the at least one processor to categorize a first image into one of a work category and a non-work category. Based on the first image being categorized into the work category, the instructions may be executable to present the first image on a display while the device is disposed at a first location associated with the work category. Based on the first image being categorized into the non-work category, the instructions may be executable to present the first image on the display while the device is disposed at a second location associated with the non-work category.

20 Claims, 6 Drawing Sheets

CATEGORIZATION OF PHOTOGRAPHS

FIELD

The present application relates to technically inventive, non-routine solutions that are necessarily rooted in computer technology and that produce concrete technical improvements.

BACKGROUND

As recognized herein, users might accidentally share digital photographs taken with their smart phones that are personal in nature while they at work, and that are professional in nature while they are not at work. This is in part due to the fact that many devices electronically store photographs indiscriminately in mere sequential order based on date. As also recognized herein, not only is this frustrating and inconvenient, but it can lead to personal photographs being shown while at work that are unsuitable or inappropriate to be shown to co-workers, such as photographs of the user's family or a weekend adventure that the user took. As further recognized herein, sensitive work data reflected in photographs might also be exposed when work photographs are unintentionally shown to people that are not co-workers of the user. There are currently no adequate solutions to the foregoing computer-related, technological problem related to electronic storage and presentation of photographs.

SUMMARY

Accordingly, in one aspect a device includes at least one processor, a display accessible to the at least one processor, a camera accessible to the at least one processor, and storage accessible to the at least one processor. The storage includes instructions executable by the at least one processor to actuate the camera to generate a first photograph and to categorize the first photograph into one of a work category and a personal category. Based on the first photograph being categorized into the work category, the instructions are executable to present the first photograph on the display while the device is disposed at a first location associated with the work category. Based on the first photograph being categorized into the personal category, the instructions are executable to present the first photograph on the display while the device is disposed at a second location associated with the personal category.

In some examples, the first photograph may be generated at a third location that is a first room inside a personal residence, and the first room may be associated with the work category but other rooms inside the personal residence may not be associated with the work category. In these examples, the instructions may be executable to categorize the first photograph into the work category based on the first photograph being generated at the third location and to present the first photograph on the display while the device is disposed at the first location, where the first location may be associated with a commercial building.

Also in some examples, the first and second locations may both be associated with the same geographic location defined by city or town.

Additionally, in some implementations the first location may be determined based on a current network connection.

Also in some implementations, the first photograph may be categorized into the work category based on identification of at least one object shown in the first photograph as being a predetermined object type associated with the work category. Additionally or alternatively, the first photograph may be categorized into the work category based on identification of a particular virtual private network to which the device is connected at the time the first photograph is generated. Still further, the first photograph may be categorized into the work category based on identification of a keyword as being spoken within a threshold time of generation of the first photograph, and/or based a time of day at which the first photograph is generated.

If desired, in some implementations the instructions may be executable to, based on the first photograph being categorized into the work category and responsive to a command to present photographs at the device, present the first photograph on the display while the device is disposed at the first location. The command itself may not specify that photographs of only a specific category are to be presented.

Also if desired, in some implementations the instructions may be executable to, based on the first photograph being categorized into the work category and based on launch of a photo viewing application, present the first photograph on the display while the device is disposed at the first location without receiving additional input beyond launching the photo viewing application to present photographs in the work category specifically.

In another aspect, a method includes actuating a camera on a device to generate an image and categorizing the image into one of a work category and a non-work category. The method also includes presenting the image on a display while the device is disposed at a first location associated with the work category based on the image being categorized into the work category, and presenting the image on the display while the device is disposed at a second location associated with the non-work category based on the image being categorized into the non-work category.

In some examples, the method may include performing the categorizing at least in part by executing object recognition to recognize at least one object from the image. Thus, in some examples the at least one object may include a person associated with the work category, and the image may be categorized into the work category based on the person being associated with the work category. In other examples, the at least one object may include an inanimate object associated with the work category, and the image may be categorized into the work category based on the inanimate object being associated with the work category.

Additionally, in some implementations the method may include receiving input from at least one microphone and executing voice recognition to determine whether speech indicated in the input is related to a user's work, where the speech may be spoken within a threshold time of the image being generated. In these implementations, the method may then include categorizing the image into the work category responsive to determining that the speech is related to the user's work.

Also in some implementations, the method may include identifying an area at which the image was generated, where the area may be established by a room within a building where the room but not the entire building may be associated with the work category. In these implementations, the method may then include categorizing the image into the work category responsive to identifying the area. In some examples, the building may be a personal residence. In other examples, the room may be a first room, the first room may be within a commercial building, and the commercial building may include at least a second room different from the first room that is associated with the non-work category.

In still another aspect, at least one computer readable storage medium (CRSM) that is not a transitory signal includes instructions executable by at least one processor to categorize data into one of a work category and a non-work category. Based on the data being categorized into the work category, the instructions are executable to present the data on a display while a device that controls the display is disposed at a first location associated with the work category. Based on the data being categorized into the non-work category, the instructions are executable to present the data on the display while the device is disposed at a second location associated with the non-work category.

In some examples, the instructions may also be executable to present data categorized into the work category automatically while the device is at locations associated with the work category, and to present data categorized into the non-work category while the device is at locations associated with the work category responsive to user command to present data categorized into the non-work category. In these examples, the instructions may be further executable to present data categorized into the non-work category automatically while the device is at locations associated with the non-work category, and to present data categorized into the work category while the device is at locations associated with the non-work category responsive to user command to present data categorized into the work category.

The details of present principles, both as to their structure and operation, can best be understood in reference to the accompanying drawings, in which like reference numerals refer to like parts, and in which:

DETAILED DESCRIPTION

Figure 1:
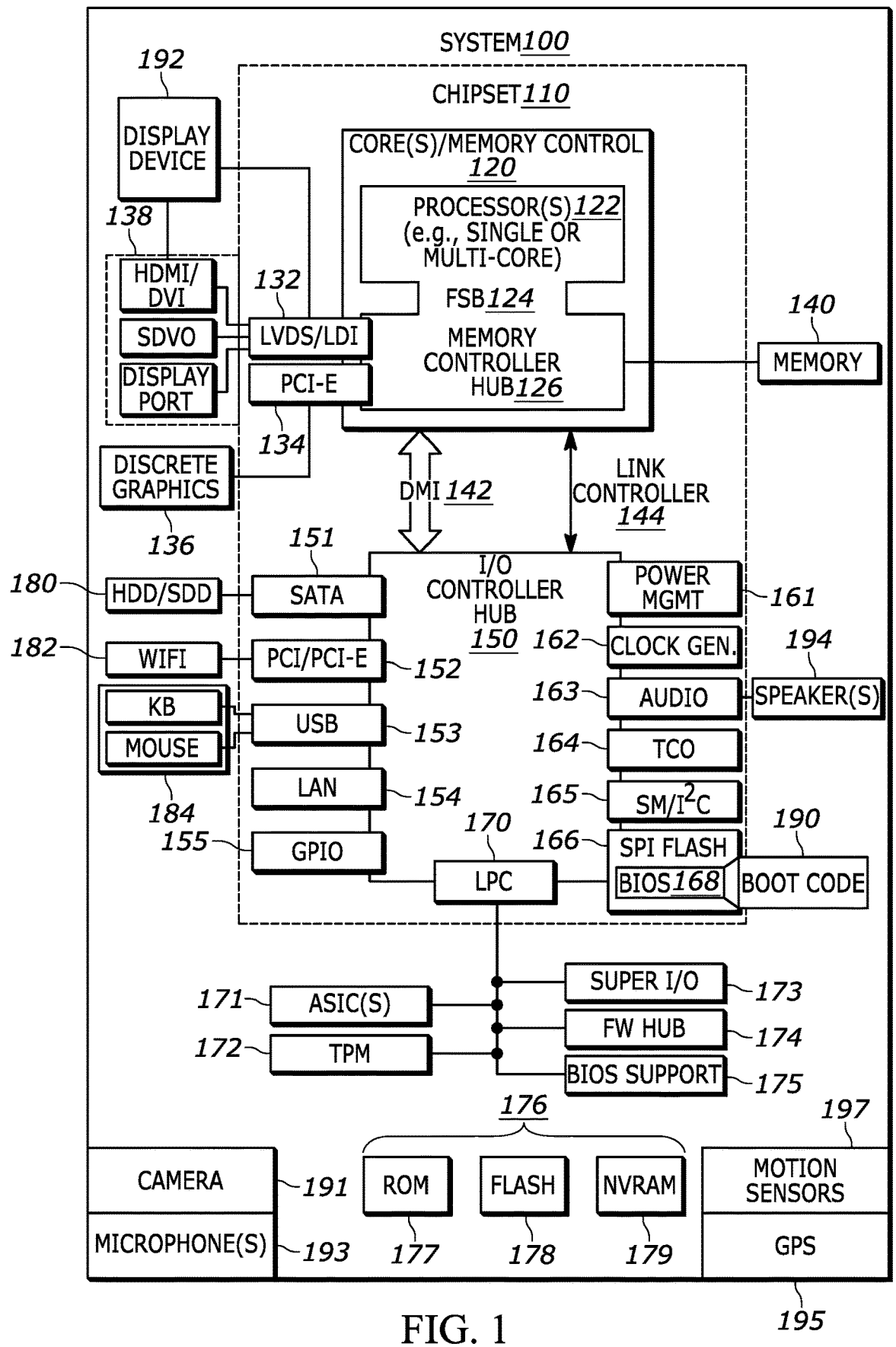
FIG. 1 is a block diagram of an example system consistent with present principles.

Among other things, the present application discloses systems and methods for geofence areas to be tied or linked to certain categories, such as an office location being tied to a user's work category while non-work areas may identified as falling under the personal category. Thus, once a photograph is taken with a smart phone, the photograph may be categorized by the area in which it was taken.

Then, photos tied to a certain category can be accessed directly and seamlessly when the user is in a matching area for that category. However, to access photographs (or even other content such as video, audio video, word processing documents and portable document format (PDF) documents, etc.) from outside the category area, a user may provide additional input or manual confirmation. For example, a user may provide additional input to access work photographs when the device at which the work photographs are stored is located outside of one or more locations for the work category geofence. This may help prevent accidental exposure of content from outside the user's current category, such as transferring personal photos to a work computer by accident or showing work photos to personal friends when the photos are not relevant to the user's personal friends.

For instance, a user might take a photograph while in his or her home office in a personal residence. Then, when the user is back at his or her primary office location at the user's company's commercial building for its employees that is in the same city or town as the user's home office, the user and his or her co-workers may view photos on the user's electronic camera roll that were taken at the home office (or even the commercial building itself) without having personal photographs presented along with the work photographs. This may be more helpful than, for example, the device not grouping photos at all or merely blindly grouping photographs together by different macro-geographic locations that are defined by city or town in which the photos were taken since work and personal photographs might both be taken in the same city and thus register together.

Thus, consistent with present principles, photographs may be grouped by different categories for, e.g., different sides of the user's life as well as activity context and different target audiences/viewers.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java/JavaScript, C#or C++, and can be stored on or transmitted from a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include an audio receiver/microphone 193 that provides input from the microphone to the processor 122 based on audio that is detected, such as via a user speaking consistent with present principles. The system 100 may also include a camera 191 that gathers one or more images and provides input related thereto to the processor 122. The camera 191 may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Also, the system 100 may include a global positioning system (GPS) transceiver 195 that is configured to communicate with at least one satellite to receive/identify geographic position information (including altitude) and provide the geographic position information to the processor 122. However, it is to be understood that another suitable position receiver other than a GPS receiver may be used in accordance with present principles to determine the location of the system 100.

In some embodiments, the system 100 may further include one or more motion sensors 197 such as a gyroscope that senses and/or measures the orientation of the system 100 and provides input related thereto to the processor 122, as well as an accelerometer that senses acceleration and/or movement of the system 100 and provides input related thereto to the processor 122.

It is to be understood that an example client device or other machine/computer may include fewer or more features than shown on the system 100 of FIG. 1. In any case, it is to be understood at least based on the foregoing that the system 100 is configured to undertake present principles.

Figure 2:
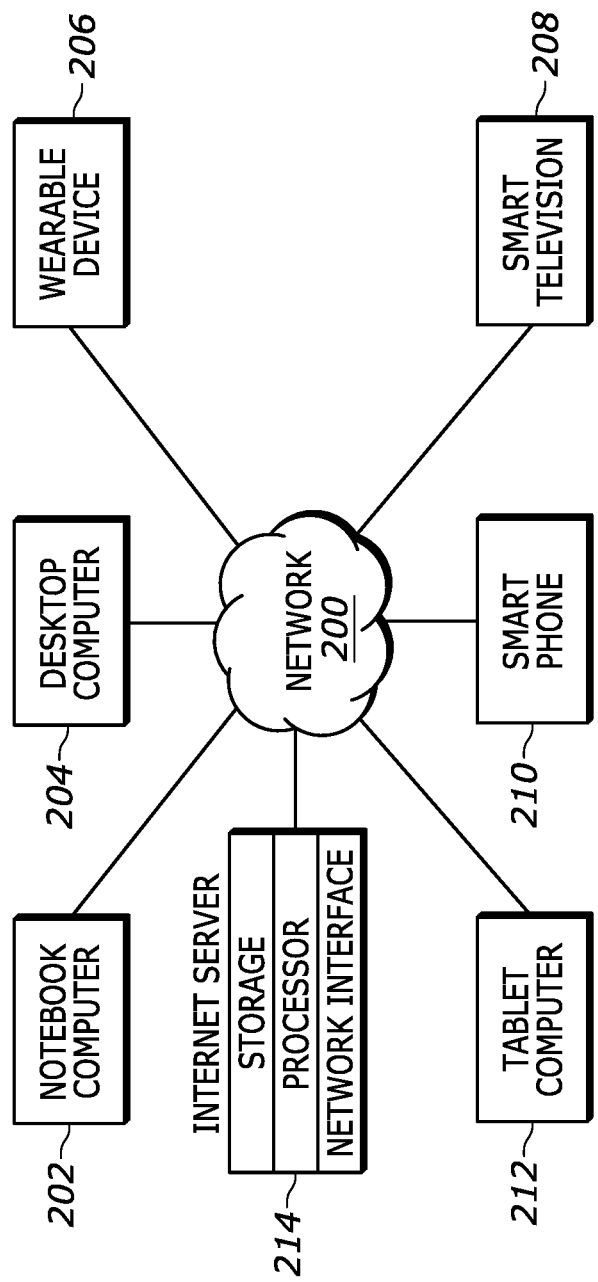
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
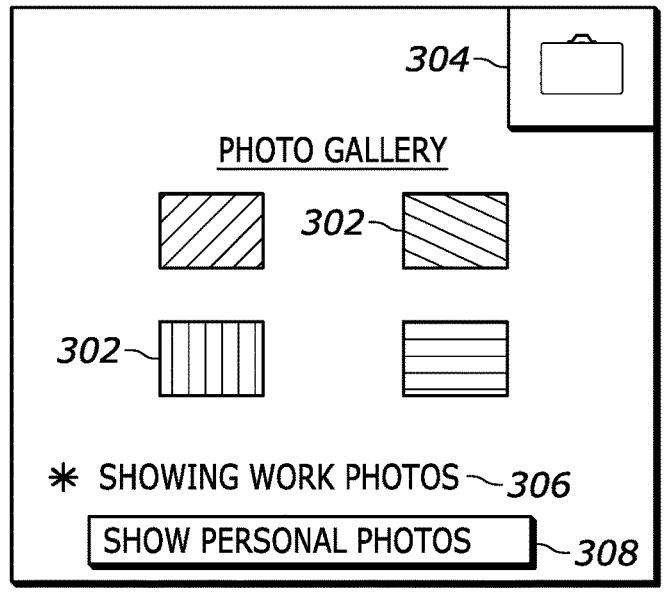
FIGS. 3 and 4 show examples of graphical user interfaces (GUIs) that may be presented on a display for viewing photographs consistent with present principles.

Now describing FIG. 3, it shows an example graphical user interface (GUI) 300 that may be presented on the display of a device consistent with present principles. The GUI 300 may be part of a photo gallery application and may be configured to present photographs in thumbnail form as shown. The thumbnails 302 may be arranged in reverse-chronological order from left to right, top to bottom.

The GUI 300 itself may be presented responsive to a command to present photographs at the device, such as selection of an associated application icon from an applications list presented on the device's display to then launch/initiate the associated application itself and present the thumbnails through the application. However, the command may not specify that photographs of only a specific category are to be presented as might otherwise be provided using a "sort" function or through an additional user request to present only photos of a specific category that is received after the launching of the application itself.

Accordingly, responsive to a command to launch the application and/or a command to present photographs, the GUI 300 may be presented without receiving one or more additional user commands (e.g., beyond the command to launch the application itself) to only present photographs of a certain category. Consistent with present principles and responsive to launch of the application, the device may then present only photograph thumbnails 302 that have been categorized into a category associated with a current location of the device itself. Example categories include a work category, and a personal or other non-work category. In the example shown in FIG. 3, only thumbnails 302 associated with the work category are presented.

The current location of the device itself may be identified a number of ways as will be discussed further below, but at this point note that the current location may not necessarily be a particular city, state, country, or even particular single set of GPS coordinates. Instead, the current location may be determined to be, for example, a certain room within a building such as a personal residence or commercial building (or even a certain building at a multi-building location). The room itself may be associated with one of the categories, even if other rooms within the same building are associated with other categories. For example, a home office room may be associated with the work category while other rooms in the same personal residence (e.g., a kitchen, living room, bedrooms, bathrooms, etc.) may be associated with the non-work category. As another example, a cubicle within a commercial building may be associated with the work category while a break room or kitchen within the commercial building may be associated with the non-work category.

Thus, photographs/thumbnails 302 categorized into the work category may be automatically presented on the display while the device is disposed within the home office room or cubicle, while photographs/thumbnails 302 for the non-work category may not be presented. Conversely, photographs/thumbnails 302 categorized into the non-work category may be automatically presented on the display while the device is disposed within other rooms of the personal residence or in the break room of the commercial building, while photographs/thumbnails 302 for the work category may not be presented.

FIG. 3 shows an example of the former in that the thumbnails 302 are all associated with the work category owing to the device being currently located within the home office of a personal residence in this example. As shown, a graphical icon or other non-text graphical object 304 may be presented (a briefcase in this example) to indicate that only thumbnails for the work category are being presented. Text 306 may also be presented to indicate that thumbnails 302 for the work category are being presented.

A selector 308 may also be presented on the GUI 300, where the selector 308 may be selectable based on touch or cursor input to provide a command to the device specifying that additional photographs of a specific, different category (non-work in this case) are to be presented in addition to or in lieu of the work category thumbnails 302. Thus, responsive to selection of the selector 308 and while still in the home office room location, the device may insert additional thumbnails from the other category associated with the selector 308 (non-work) into the GUI 300 so that photos from both categories are presented together in reverse-chronological order. In other embodiments, responsive to selection of the selector 308 and while still in the home office room location, the device may remove the thumbnails 302 from being presented on the display and only present, in reverse-chronological order, thumbnails from the other category associated with the selector 308 (non-work) on the GUI 300.

Before moving on in the detailed description, note that in other examples where the device is disposed at another location associated with the non-work category (such as a living room or common area of the same personal residence) and the photo gallery application is launched or a request to present photographs is otherwise provided by the end-user, the GUI 300 may instead present only thumbnails for the non-work category unless a selector similar to the selector 308 is selected to command the device to show photographs from the work category in addition to or in lieu of photos for the non-work category, similar to as already described above. Also note that a different graphical icon than the icon 304 may be presented for the personal category, such as an image of a family or an image of the end-user himself or herself. Still further, different text than the text 306 may be presented to instead indicate that the GUI 300 is showing non-work photos (e.g., "showing personal photos").

Figure 4:
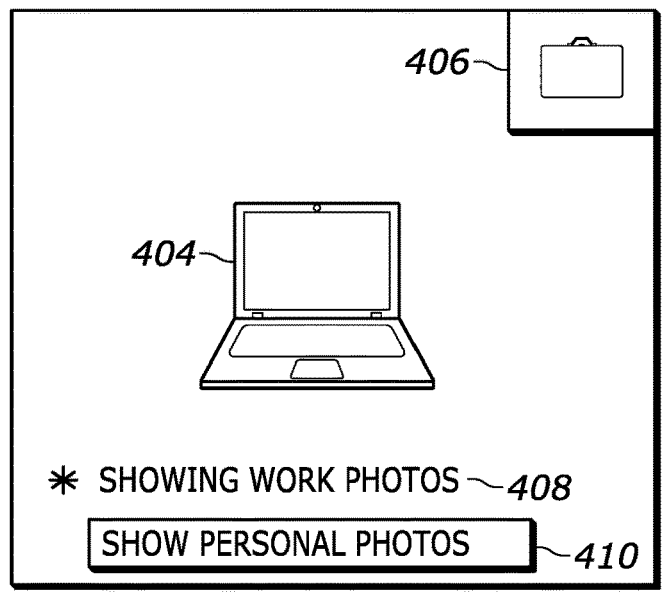

Now describing FIG. 4, it shows an example photograph 402 presented as part of a GUI 400, where the photograph 402 may be presented on the display of the device while the device is located at a location associated with the work category, such as the home office room of a personal residence. Similar to the GUI 300, the GUI 400 may be part of a photo gallery application but in this case may be configured to present photographs in full screen mode as shown. Thus, only the single photograph 402 of a laptop computer 404 is shown. The user may then scroll through other photos of only the work category in reverse chronological order using the GUI 400 by directing right-to-left swipes using a finger against the touch-enabled display on which the photographs are presented.

Thus, note that a first photograph 402 for the work category may be presented full screen via the GUI 400 responsive to a command to present photographs at the device, such as selection of an application icon from an applications list presented on the device to then launch/initiate the associated application itself and present photographs through the application. Alternatively, the photograph 402 may be presented responsive to selection of a corresponding one of the thumbnails 302 from the GUI 300 that represents the photograph 402 to then present the selected photo (photo 402) in full screen mode rather than as a thumbnail. However, note that either way the command may still not specify that photographs of only a specific category are to be presented as might otherwise be provided using a "sort" function or through a user request to present only photos of a specific category that is received after the launching of the application itself.

Accordingly, responsive to the command, photos associated with the work category may be presented sequentially via the GUI 400 as the user swipes through them without the device also receiving one or more additional user commands (beyond the command to launch the application itself or the selection of the associated thumbnail) to only present photographs of that certain category. So for example, responsive to launch of the application the device may present only photographs, one at a time as the user scrolls through them, that have been categorized into a category associated with a current location of the device itself, which in this example is again the work category.

However, if the device were to change locations within the building such as changing to be disposed in a bedroom instead of the home office room, different photographs for the non-work category may instead be presented in full screen mode via the GUI 400 so that the user may view and scroll through them instead. Thus, full screen photographs categorized into the work category may be automatically presented on the display while the device is disposed within the home office room while photographs for the non-work category may not be presented. Conversely, photographs categorized into the non-work category may be automatically presented on the display while the device is disposed within the bedroom of the personal residence while photographs for the work category may not be presented.

As also shown in FIG. 4, a graphical icon or other non-text graphical object 406 may be overlaid on the photo 402 (again a briefcase in this example) to indicate that only thumbnails for the work category are being presented. Text 408 may also be overlaid on the photo 402 to indicate that photographs for the work category are being presented full screen.

A selector 410 may also be presented, where the selector 410 may be selectable based on touch or cursor input to provide a command to the device specifying that additional photographs of a specific, different category (non-work in this case) are to be presented full screen in addition to or in lieu of the work category photographs. Thus, responsive to selection of the selector 410 and while still in the home office room location, the device may insert additional photos from the other category associated with the selector 410 (non-work) into the sequence of photos that are being scrolled full screen so that photos from both categories are presented together in reverse-chronological order as the user scrolls right to left. However, in other embodiments responsive to selection of the selector 410 and while still in the home office room location, the device may stop presenting photos for the work category based on the user scrolling and only present, in reverse-chronological order as the user scrolls, photos in full screen mode from the other category associated with the selector 410 (non-work) so that photos from only the non-work category are presented in reverse-chronological order even though the device remains disposed within the home office room location.

Before moving on in the detailed description, note that in other examples where the device is disposed at another location associated with the non-work category (such as being disposed in a living room or common area of the same personal residence) and the photo gallery application is launched or a request to present photographs full screen is otherwise provided by the end-user, the GUI 400 may instead present only photos for the non-work category unless a selector similar to the selector 410 is selected to command the device to show photographs from the work category in addition to or in lieu of the non-work category, similar to as already described above. Also note that a different graphical icon than the icon 406 may be presented for the personal category, such as an image of a family or an image of the end-user himself or herself. Still further, different text than the text 408 may be presented to instead indicate that the GUI 400 is showing non-work photos in full screen (e.g., "showing personal photos").

Figure 5:
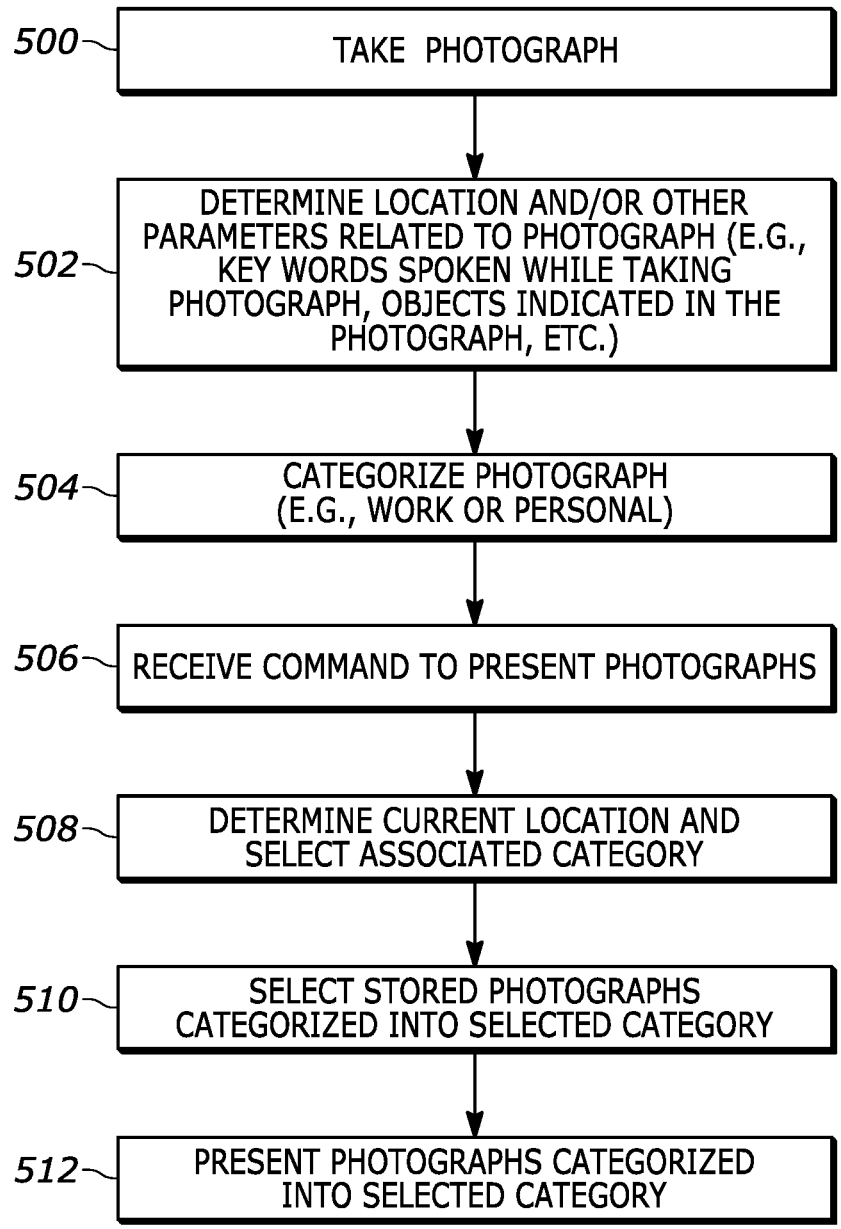
FIG. 5 is a flow chart of an example algorithm consistent with present principles.

Now describing FIG. 5, it shows example logic that may be executed by a device such as an end-user's device and/or the system 100 consistent with present principles. However, also note that various steps of the logic of FIG. 5 may also be executed by a remotely-located server communicating with the end-user's device as appropriate if, for example, photographs are being stored and maintained in cloud storage at the server. For example, categorizing the photographs themselves based on the location at which they were taken as will be described below may occur at the server after the photo has been uploaded by the end user's device.

Beginning at block 500, the device may actuate a camera disposed on the device (or elsewhere but in communication with the device) to generate or take a photograph according to the camera's current field of view. For instance, the device may take a photograph responsive to a user command/button press to take a photograph while the user views the camera's real-time field of view on the device's display using a viewfinder GUI of an associated camera application.

From block 500 the logic may proceed to block 502. At block 502 the device may determine the current location of the device and/or determine other parameters consistent with the description herein. Then at block 504 the device may categorize or assign the photograph to a particular category based on the determination(s) at block 502.

For example, different rooms within a building may have different GPS coordinates corresponding to their respective locations. The current location of the device may therefore be identified by receiving GPS coordinates from a GPS transceiver on the device and then accessing a lookup table or relational database to determine which category (e.g., work or personal) has already been assigned to the GPS coordinates that are received. The photograph taken at block 500 may then be assigned to that category.

As another example, the location and/or category itself may be determined based on a current network connection. For instance, if the device is currently connected to a particular Wi-Fi network with a particular service set identifier (SSID), or to a particular local area network (LAN), that has been associated with one category or another in a relational database or lookup table, being connected to that network may indicate location and so the category associated with the current network connection may be identified from the relational database or lookup table. The photograph taken at block 500 may then be assigned to that category.

Furthermore, a virtual private network (VPN) that might be currently in use by the device to communicate with other devices may also be used to determine into which category to categorize the photograph that was taken at block 500, even if the non-virtual network being used (e.g., Wi-Fi network) for the VPN connection is associated with a different category. For instance, a particular VPN may be associated with the work category in a relational database or lookup table, and therefore any photograph taken while the device is connected to and/or using the VPN may be assigned to the work category at block 504 even if the device is also connected to a Wi-Fi network otherwise associated with the non-work category.

As another example, at block 504 the device may categorize a photograph taken at block 500 into one category or another based on identification at block 502 of at least one person, other animal, or inanimate object shown in the photograph as being a predetermined person, or animal/object of a certain type, that is associated with a particular location and/or category itself. For example, at block 502 the device may execute object and/or facial recognition software to recognize a particular object or person from the photo that was taken. Then based on recognition of the person/object, the device may determine into which category to categorize the photograph using a lookup table or relational database that indicates the person or object type as being associated with a particular location and hence particular category, or even just a particular category itself regardless of location. For instance, a co-worker or white board may be associated with the work category while a dog may be associated with the personal category.

As still another example, at block 502 the device may analyze microphone input received via a microphone on or otherwise accessible to the device around the time that the photograph was taken, such as within a threshold time before or after generation of the photograph (e.g., ten seconds before or after). Voice recognition software may then be executed to determine whether speech indicated in the microphone input is related to the user's work to then assign the photograph to one category or another at block 504. To do so, the speech data from the voice recognition may be passed through an artificial neural network configured to classify the speech as being related to the work category or non-work category at block 504 based on whether the speech indicates something related to the user's work or not.

As another example, the speech data may be analyzed to determine whether the user's speech indicates any predetermined keywords that have already been associated with one category or another. The keywords may be, for example, a name of the company for which the user works (work category), a description of a project or apparatus that the user is working on for the company (also work category), a name of a family member or pet of the user (non-work category), or a pop-culture reference (non-work category). To this end, a lookup table or relational database indicating keyword/category associations may be used to categorize the photo at block 504. Also, note that the voice recognition software itself that is used by the device may form part of a digital assistant executing at the device, such as Amazon's Alexa, Google's Assistant, or Apple's Siri.

As yet another example, at block 502 the device may use a dead reckoning algorithm and data from a motion sensor such as gyroscope and/or accelerometer on the device to infer a current location of the device as it has moved from a previously-known location. The inferred current location may then be used to determine into which category to categorize the photograph using, e.g., a lookup table or relational database of location/category combinations as discussed above. Similarly, location may help categorize the photo when location is determined using a received signal strength indicator (RSSI) algorithm and the detected strength of signals from a Wi-Fi router or access point having an already-known location. If the device is connected to multiple access points or routers, triangulation may also be used.

Providing another example, input from another camera different from the one that took the photo at block 500 may be used. For example, a thermostat camera or doorbell camera in communication with the device but not disposed on it may be used to determine user presence at a particular location or even a particular activity in which the user is engaged (besides taking the photograph itself). To this end, facial recognition and/or action recognition software may be used for such purposes. Then based on the user's presence being identified at a particular location associated with one category or another, or based on the user's activity being identified as associated with one category or another (e.g., in a lookup table or relational database), the photograph may be categorized at block 504.

As still another example, if an inbox for a particular email address associated with one category or another is currently open when the photograph is taken at block 500, that inbox or email address that is in use/open at the time the photograph is taken (or within a threshold time of the photo being taken) may be used to determine an associated category to assign to the photograph at block 504 using a lookup table or relational database with email/category associations. For example, a work email address inbox that is open in a web browser executing at the device when a photo is taken may be used to determine that the photo should be assigned to the work category.

As yet another example, time of day may be used. So, for instance, if a photograph is taken during business hours (e.g., Monday through Friday, 8:00 a.m. to 5:00 p.m. local time of the device), the photo may be assigned to the work category. But if the photograph were taken during non-business hours, the photo may be assigned to the personal category.

As but one more example, other devices with which the device is currently communicating, and/or a communication standard that is being used for communication, may be used to assign the photograph to one category or another at block 504. For instance, if the device communicates over a specific wireless standard (such as Bluetooth communication) that is associated with a certain category within a threshold time of the photo being taken, the device may assign the photo to the associated category. As another example, if the device communicates with a particular device associated with a certain category within the threshold time (e.g., regardless of which communication protocol is being used), the device may assign the photo to the associated category. Thus, here again a lookup table or relational database making such associations may be used.

Still in reference to FIG. 5, after categorizing the photograph at block 504, the logic may proceed to block 506. At block 506 the device may receive a request to present photographs according to the description above (e.g., selection of an app icon to launch an application used to present photographs). The logic may then proceed to block 508.

At block 508 the device may determine a current location of the device, which may not be the same as the location that might have been determined at block 502 owing to the command to present photographs being received at a later time than when a photograph might have been taken at block 500. But again, the current location may be determined at block 508 using any appropriate method as described above (e.g., GPS coordinates, RSSI, connection to a Wi-Fi network known to be associated with a certain location, dead reckoning, or even a livefeed from the device's camera from which the current location can be identified).

Other contexts as set forth herein that might be occurring at or within a threshold time of the command being received at block 506 may also be used to determine, at block 508, which category of photographs should be presented. For example, those contexts might include the device being connected to a certain VPN associated with the work category, a certain activity being identified as currently engaged in by the user that is associated with the work category, keywords being spoken that are associated with the personal category, or a face of a co-work associated with the work category being shown in a current livefeed of the camera when the command is received at block 506.

Also at block 508, the device may then select the category that has already been associated with the current location or context that is determined at block 508.

From block 508 the logic may then proceed to block 510. At block 510 the device may select stored photographs that are associated with the selected category to then present the photographs on the device's display at block 512 (e.g., according to the description of one or both of FIGS. 3 and 4 above). The photographs may be stored locally in storage of the device itself or stored remotely from it, such as in a cloud storage area maintained at a remotely-located Internet server.

Figure 6:
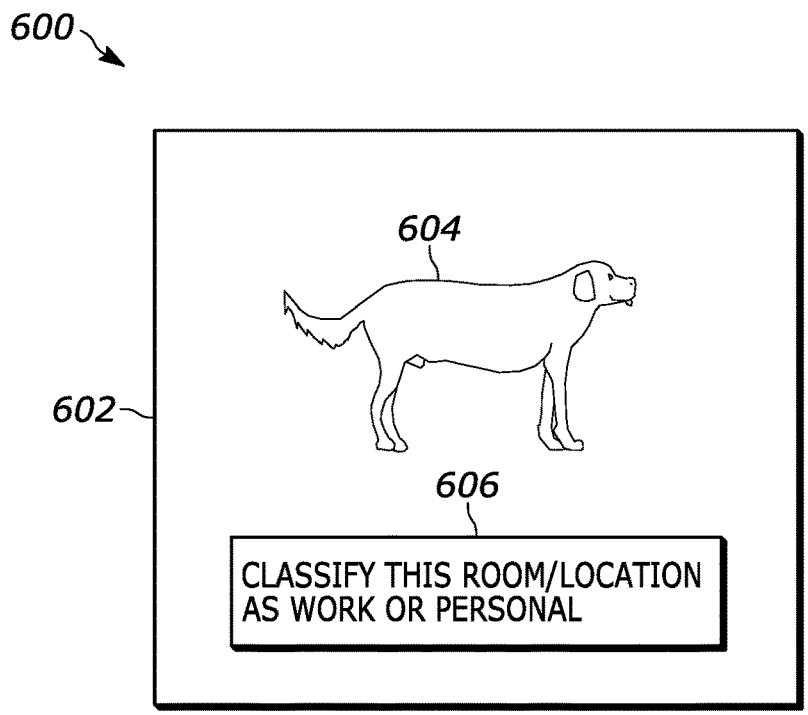
FIGS. 6 and 7 show example GUIs consistent with present principles that may be used for classifying a location or area as being associated with one of the categories disclosed herein.

Continuing the detailed description in reference to FIG. 6, it shows an example GUI 600 that may show a photograph 602 that was just taken using a camera on a device operating consistent with present principles. Thus, the GUI 600 may be presented automatically responsive to the photograph being taken, for example. Alternatively, the GUI 600 may present a livefeed/real-time feed 602 as part of a viewfinder of what the camera currently sees even if a command is not received to take a photograph or video to then store it at the device in non-volatile storage.

In either case, the photograph 602 in this example shows a dog 604 along with other items in the background (not shown for simplicity). As also shown, overlaid on the photograph 602 may be a selector 606. The selector 606 may be selectable using touch or cursor input to begin a process for the user to provide subsequent input specifying the room or other location at which the photo 602 was taken as being associated with one category or another for photo presentation at a later time (e.g., work or non-work).

Thus, it is to be understood that in some implementations the selector 606 may be overlaid on a photograph only when the location at which the photograph was taken has not yet been assigned to one category or another by a user. In other implementations, the device may by default assign a new location to one category or another, such as the non-work category, but allow the user to change the category to which the new location has been assigned by presenting the selector 606 for selection. In still other implementations, the device may present the selector 606 over top of the photo 602 for selection even if the user has already assigned the associated location to one category or another.

Figure 7:
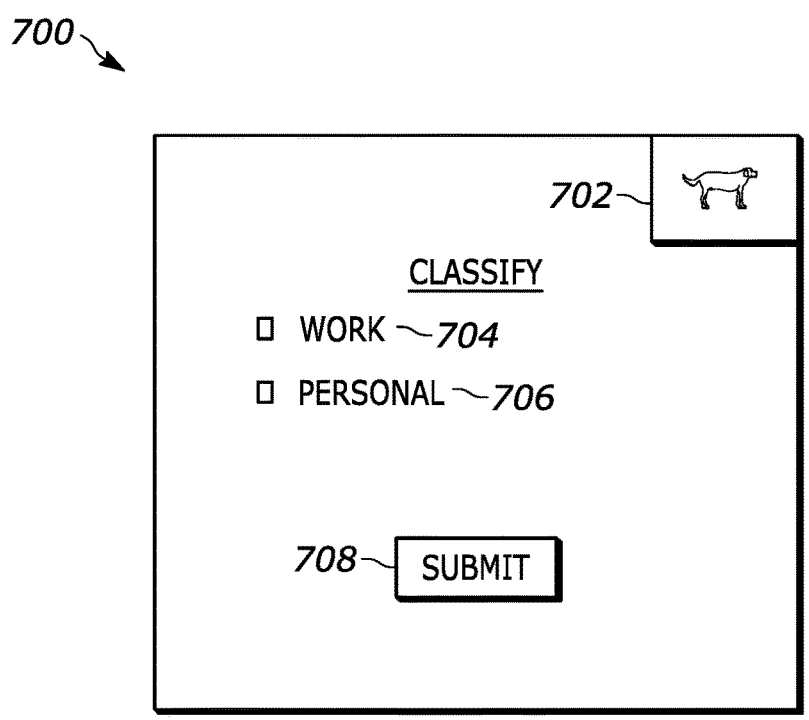

Regardless, responsive to the selector 606 being selected, the device may present the GUI 700 of FIG. 7. The GUI 700 may include a thumbnail 702 of the photograph 602 to indicate to the user which location (and the photograph 602 itself) are being assigned to a given category via the GUI 700. In order for the user to actually assign the location at which the photograph was taken to a particular category, the user may select either of the respective check boxes shown adjacent to a respective option 704, 706 to select the respective option itself. Option 704 may be selected to associate the location with the work category, while option 706 may be selected to associate the location with the personal category. Once one of the options 704, 706 are selected, the user may then select the submit selector 708 to command the device to associate the location at which the photo 602 was taken with the selected category.

Figure 8:
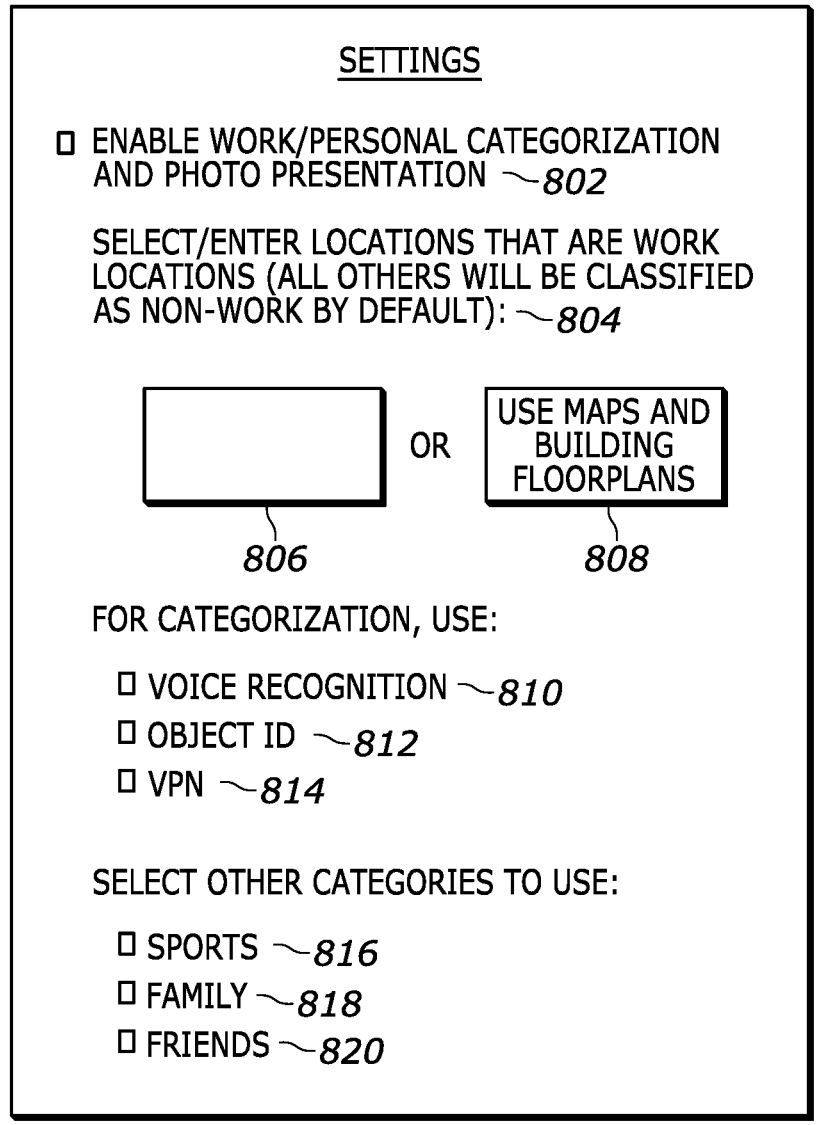
FIG. 8 is shows an example GUI that may be used for configuring one or more settings of a device that operates consistent with present principles.

Now in reference to FIG. 8, it shows an example settings GUI 800 that may be presented on the display of a device that operates consistent with present principles to configure one or more settings of the device. It is to be understood that each of the options to be described below may be selected by selecting the respective adjacent check box using touch or cursor input.

As shown in FIG. 8, the GUI 800 may include a first option 802 that may be selectable to set or enable the device to categorize photographs by location or other factors as set forth herein, as well as to set or enable the device to present photos by work and non-work categories (or other categories) based on location as set forth herein. For example, selection of the option may configure the device to undertake the functions described above in reference to FIGS. 3-7.

The GUI 800 may also include a setting 804 for a user to select or enter locations that are to be assigned to/associated with the work category so that photographs taken at those locations in the future may be classified into the work category. As may also be appreciated from FIG. 8, the setting 804 may also indicate in text that all other locations will be classified as associated with the non-work category by default. Thus, an input box 806 may be presented at which the user may enter text and/or numbers to specify a location to associate with the work category. The input to the box 806 may be in the form of a street address or other geographic location identifier (e.g., GPS coordinates). Input to the box 806 may also be in the form of specifying a particular room within a building or specifying a particular building at a multi-building site.

As another option for associating a location with a given category, selector 808 may be selected. Responsive to selection of the selector 808, the GUI 800 may be replaced on the display with an interactive geographic map or building floorplan with various discrete areas or rooms that are selectable from the map/floorplan. Selection of one of the discrete areas from the map/floorplan may thus be used as input to specify the discrete area itself to associate with the work category.

However, notwithstanding the example above, in other examples there may be no default for associating locations with the non-work category (unless, e.g., the user specifies otherwise). In these examples, a box similar to the box 806 may be presented and a selector similar to the selector 808 may be presented but to associate a given location with the non-work category according to the description above.

As also shown in FIG. 8, the GUI 800 may provide various options 810, 812, and 814 for the user to select various specific ways to categorize a photo/image into one category or another. Option 810 may be selectable to select voice recognition as one way, option 812 may be selected to use object recognition as another way, and option 814 may be presented to use connection to a VPN as yet another way. Other ways as described herein may also be listed as options and FIG. 8 only shows these three for simplicity.

Still further, the GUI 800 may include options 816, 818, and 820 to select various other categories besides work and personal to use consistent with present principles. For example, the option 816 may be presented so that only photographs associated with sports are presented by the device at locations that the device determines are associated with sports. As another example, the option 818 may be presented so that only photographs associated with the user's family are presented by the device at locations that the device determines are associated with the user's family. As one more example, the option 820 may be presented so that only photographs associated with the user's friends are presented by the device at locations that the device determines are associated with the user's friends. Locations associated with these various categories and what photographs should be assigned to each category may be determined similar to as set forth herein for the work and non-work categories. For example, a face in an image being recognized by the device as a family member of the user may be used by the device to categorize the image in the family category and present it at locations the user has associated with the family category.

Before concluding, it is to be understood that present principles may apply to classification and presentation of electronic files/data besides still photographs, such as word processing documents and portable document format (PDF) documents, that were created or modified at a certain location or within a certain context (e.g., VPN connection). Present principles may similarly apply to creation or modification of video or video-only content, audio or audio-only content (e.g., audio recordings such as voice dictations and podcasts), audio video files such as a movie taken using a smartphone's camera.

Still further, present principles may apply to presentation of emails in a primary or general email inbox that might be used for both work and personal emails using a single email address, or even used for viewing emails directed to different email addresses of the user (e.g., work and personal email addresses). Thus, certain emails may only presented in the inbox at a given time based on the emails' category when the device is at a location associated with that category. For example, an email chain that the user began by sending an initial email in the chain while at a work location may be classified into the work category and the chain may then presented in the user's inbox when the user's device is at work locations but not personal locations. As another example, emails may also be parsed for key words that may be identified as associated with the work category or non-work category, and then emails having a key word(s) for one category or another may be presented in the user's inbox when the user's device is in a location associated with the respective category.

It may now be appreciated that present principles provide for an improved computer-based user interface for photographs and other data that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor;
   a display accessible to the at least one processor;
   a camera accessible to the at least one processor; and
   storage accessible to the at least one processor and comprising instructions executable by the at least one processor to:
   actuate the camera to generate a first photograph;
   categorize the first photograph into one of a work category and a personal category;
   based on the first photograph being categorized into the work category, present the first photograph on the display while the device is disposed at a first location, the first location associated with the work category; and
   based on the first photograph being categorized into the personal category, present the first photograph on the display while the device is disposed at a second location, the second location associated with the personal category;
   wherein the first photograph is generated at a third location that is a first room inside a personal residence, the first room being associated with the work category but other rooms inside the personal residence not being associated with the work category, and wherein the instructions are executable to:
   categorize the first photograph into the work category based on the first photograph being generated at the third location; and
   present the first photograph on the display while the device is disposed at the first location, the first location being associated with a commercial building.

2. The device of claim 1, wherein the first and second locations are both associated with the same geographic location defined by city or town.

3. The device of claim 1, wherein the first photograph is categorized into the work category based on identification of at least one object shown in the first photograph as being a predetermined object type associated with the work category.

4. The device of claim 1, wherein the first photograph is categorized into the work category based on identification of a keyword as being spoken within a threshold time of generation of the first photograph.

5. The device of claim 1, wherein the first photograph is categorized into the work category based a current time of day at which the first photograph is generated being during business hours.

6. The device of claim 1, wherein the instructions are executable to:
   based on the first photograph being categorized into the work category and responsive to a command to present photographs at the device, present the first photograph on the display while the device is disposed at the first location, the command itself not specifying that photographs of only a specific category are to be presented.

7. The device of claim 1, wherein the instructions are executable to:
   based on the first photograph being categorized into the work category and responsive to launch of a photo viewing application subsequent to the first photograph being categorized, present the first photograph on the display while the device is disposed at the first location without receiving additional input beyond launching the photo viewing application to present photographs in the work category specifically.

8. The device of claim 1, wherein the first photograph is categorized into the work category based on identification of a particular virtual private network to which the device is connected at the time the first photograph is generated.

9. A method, comprising:
   actuating a camera on a device to generate an image;
   categorizing the image into one of a work category and a non-work category;
   based on the image being categorized into the work category, presenting the image on a display while the device is disposed at a first location associated with the work category; and
   based on the image being categorized into the non-work category, presenting the image on the display while the device is disposed at a second location associated with the non-work category;
   wherein the method comprises:
   receiving input from at least one microphone;
   executing voice recognition to determine whether speech indicated in the input is related to a user's work, the speech being spoken within a threshold time of the image being generated; and
   responsive to determining that the speech is related to the user's work, categorizing the image into the work category.

10. The method of claim 9, comprising:
    performing the categorizing at least in part by executing object recognition to recognize at least one object from the image.

11. The method of claim 10, wherein the at least one object comprises a person associated with the work category, and wherein the image is categorized into the work category based on the person being associated with the work category.

12. The method of claim 10, wherein the at least one object comprises an inanimate object associated with the work category, and wherein the image is categorized into the work category based on the inanimate object being associated with the work category.

13. The method of claim 9, comprising:
    identifying an area at which the image was generated, the area established by a room within a building, the room but not the entire building being associated with the work category; and
    responsive to identifying the area, categorizing the image into the work category.

14. The method of claim 13, wherein the building is a personal residence.

15. The method of claim 13, wherein the room is a first room, wherein the first room is within a commercial building, and wherein the commercial building comprises at least a second room different from the first room, the second room associated with the non-work category.

16. At least one computer readable storage medium (CRSM) that is not a transitory signal, the computer readable storage medium comprising instructions executable by at least one processor to:
- categorize data into one of a work category and a non-work category;
- based on the data being categorized into the work category, present the data on a display while a device that controls the display is disposed at a first location associated with the work category; and
- based on the data being categorized into the non-work category, present the data on the display while the device is disposed at a second location associated with the non-work category;

wherein the instructions are executable to:
present data categorized into the work category automatically while the device is at locations associated with the work category, and present data categorized into the non-work category while the device is at locations associated with the work category responsive to user command to present data categorized into the non-work category; and
present data categorized into the non-work category automatically while the device is at locations associated with the non-work category, and present data categorized into the work category while the device is at locations associated with the non-work category responsive to user command to present data categorized into the work category.

17. The CRSM of claim 16, wherein the data comprises emails presented in an inbox, the inbox presenting emails categorized into the work category automatically while the device is at locations associated with the work category, the inbox presenting emails categorized into the non-work category automatically while the device is at locations associated with the non-work category.

18. The CRSM of claim 16, wherein the instructions are executable to:
- categorize data into one of the work category and the non-work category based on execution of activity recognition to identify an activity in which a user is engaged and that is associated with one of the work and non-work categories, the activity being an activity other than taking a photograph.

19. The CRSM of claim 16, wherein the instructions are executable to:
- receive input from at least one microphone;
- execute voice recognition to determine whether speech indicated in the input is related to a user's work, the speech being spoken within a threshold time of the data being generated; and
- responsive to determining that the speech is related to the user's work, categorize the data into the work category.

20. The CRSM of claim 16, wherein user commands to present data categorized into the non-work category is received based on user selection of a selector presented on a display concurrently with the data that is categorized into the work category being presented on the display and while the device is at locations associated with the work category.

* * * * *